US012806545B2

(12) United States Patent
Mayer et al.

(10) Patent No.: US 12,806,545 B2
(45) Date of Patent: Nov. 24, 2026

(54) SLUDGE SEPARATOR

(71) Applicant: WashTec Holding GmbH, Augsburg (DE)

(72) Inventors: Stefan Mayer, Neusäß (DE); Andreas Sattler, Munich (DE)

(73) Assignee: WashTec Holding GmbH, Augsburg (DE)

( * ) Notice: Subject to any disclaimer, the term of this patent is extended or adjusted under 35 U.S.C. 154(b) by 397 days.

(21) Appl. No.: 18/281,178

(22) PCT Filed: Feb. 25, 2022

(86) PCT No.: PCT/EP2022/054849
§ 371 (c)(1),
(2) Date: Sep. 8, 2023

(87) PCT Pub. No.: WO2022/189173
PCT Pub. Date: Sep. 15, 2022

(65) Prior Publication Data

US 2024/0216836 A1 Jul. 4, 2024

(30) Foreign Application Priority Data

Mar. 10, 2021 (DE) ..................... 10 2021 105 798.1

(51) Int. Cl.
*B01D 21/24* (2006.01)
*B01D 21/00* (2006.01)

(52) U.S. Cl.
CPC ...... *B01D 21/2411* (2013.01); *B01D 21/0024* (2013.01); *B01D 21/2427* (2013.01); *B01D 21/2444* (2013.01)

(58) Field of Classification Search
CPC ............ B01D 21/2411; B01D 21/0024; B01D 21/2427; B01D 21/2444; B01D 21/24;
(Continued)

(56) References Cited

U.S. PATENT DOCUMENTS 5,180,407 A * 1/1993 DeMarco .................. B04C 1/00 55/459.1
2005/0077248 A1* 4/2005 Stark .................. B01D 21/0006 210/801
(Continued)

FOREIGN PATENT DOCUMENTS

DE 9208376 U1 11/1992
DE 9312973 U1 2/1994
(Continued)

OTHER PUBLICATIONS

International Preliminary Report on Patentability for PCT/EP2022/054849 filed Feb. 25, 2022.
(Continued)

*Primary Examiner* — Akash K Varma
(74) *Attorney, Agent, or Firm* — Fleit Intellectual Property Law; Paul D. Bianco

(57) ABSTRACT

A sludge separator, in particular for a vehicle washing system, has a sedimentation tank with a side wall and a base. The tank is divided into a lower sedimentation region, an intermediate region, and an upper fluid exchange region. The sludge separator has an inlet for supplying a fluid carrying solid particles into the tank, the inlet including an end section having an inlet opening. The inlet opening is arranged in the upper fluid exchange region and opens into the tank in a horizontal plane in a peripheral region of the tank. The sludge separator also has an outlet for discharging fluid out of the tank, the outlet having an outlet opening arranged in the upper fluid exchange region. The end section is orientated such that supplied fluid flows into the tank tangentially, and the outlet opening is arranged in a central region of the tank in a horizontal plane.

20 Claims, 4 Drawing Sheets

(58) Field of Classification Search
CPC ........ B01D 21/00; B01D 21/02; B01D 21/26; B01D 21/0006; E03F 5/14; B04C 1/00
USPC .................................. 210/532.1, 801, 512.1
See application file for complete search history.

(56) References Cited

U.S. PATENT DOCUMENTS

| | | | | |
|---|---|---|---|---|
| 2007/0267342 | A1* | 11/2007 | Cobb ........................ | E03F 5/14 210/512.1 |
| 2017/0274300 | A1 | 9/2017 | Bobbert | |

FOREIGN PATENT DOCUMENTS

| | | | |
|---|---|---|---|
| DE | 9412973 | U1 | 10/1994 |
| DE | 9414562 | U1 | 11/1994 |
| DE | 4400712 | A1 | 7/1995 |
| EP | 0703324 | A1 | 3/1996 |
| EP | 2463444 | | 6/2012 |
| EP | 2893981 | A1 | 7/2015 |
| EP | 3222357 | A1 | 9/2017 |
| FR | 2536672 | A1 | 6/1984 |
| WO | 2009/122127 | A1 | 10/2009 |

OTHER PUBLICATIONS

International Search Report dated Sep. 23, 2022 with Written Opinion for PCT/EP2022/054849 filed Feb. 25, 2002.

* cited by examiner

SLUDGE SEPARATOR

FIELD OF THE INVENTION

The present invention relates to a sludge separator, in particular for a vehicle washing system, having a sedimentation tank that has a side wall and a base. Here, the sedimentation tank is divided in the vertical direction into a lower sedimentation region, an intermediate region and an upper fluid exchange region. The sludge separator further has an inlet for supplying a fluid carrying solid particles into the sedimentation tank, which inlet has an end section having an inlet opening, wherein the inlet opening is arranged in the upper fluid exchange region in the vertical direction and opens into the sedimentation tank in a horizontal plane in a peripheral region of the sedimentation tank. Furthermore, the sludge separator has an outlet for discharging fluid out of the sedimentation tank, which outlet has an outlet opening which is arranged in the upper fluid exchange region in the vertical direction.

BACKGROUND

A sludge separator for separating particles contained in a fluid is known from EP 2 463 444 D1. The sludge separator has an upper inlet opening, a separator housing and a lower outlet opening. The inlet opening and the outlet opening are arranged coaxially with respect to the vertical housing axis. The sludge separator is flowed through in the vertical direction, from the upper inlet opening to the lower outlet opening. Here, the supplied fluid passes through a particle separator having flow deflection elements which effect a flow deflection between the axial and radial direction. The substances to be separated are separated with these flow deflection elements. They settle in a collecting pot and are led out from there via a discharge line.

Furthermore, sludge separators are known that work according to the cyclone principle. For example, WO 2009/122127 A1 describes a sludge separator having a cup-like separation tank having an inlet for supplying fluid into the separation tank arranged in the upper tank region and an outlet for discharging the fluid out of the separation tank arranged in the upper tank region. A pipe that is open at the bottom is arranged coaxially inside the separation tank. The outlet is connected communicatively with the interior of the pipe, the inlet opens into a ring-shaped intermediate space between the tank wall and the pipe. The inlet and the outlet are arranged such that fluid guided into the separation tank flows in a cyclone-like movement along the tank wall and downwards, and then flows upwards through the pipe to the outlet inside the cyclone-like, downwards-flowing fluid. Solid particles separated by means of the cyclone effect sink along the tank wall and downwards into a sludge settling space provided at the bottom end of the tank.

Further sludge separators according to the cyclone principle are known from EP 2 893 981 A1 and EP 3 222 357 B1.

A sludge trap for waste water polluted with sediments is known from DE 94 14 562 U1. The sludge trap consists of a stilling tank that has a lower inlet on the side and an upper outlet. The opening of the inlet is orientated approximately tangentially to the wall of the stilling tank. The upper outlet is arranged roughly in the centre of the stilling tank. Further, the central upper outlet is surrounded at a distance by a hollow body-shaped, permeable insert placed around it vertically. By means of the geometry of the inlet and the outlet, a spiral-like flow around the hollow body-shaped insert is created, which flows in a spiral from the bottom to the top, to the outlet.

A separation installation having a similar sludge trap is described in DE 94 12 973 U1. The sludge trap of this separation installation is meant to separate sediments in the waste water of a car washing facility, for example.

Furthermore, a separation tank is known from DE 92 08 376 U1, which can optionally be used as a sludge trap or as a pre-separator having an inlet and an outlet. In this separation tank, the inlet and the outlet are arranged at approximately the same height in the upper region opposite each other on the edge of the tank. When used as a sludge trap, deflector plates are mounted on the inlet and on the outlet.

In a sludge separator which, for example, is used in a vehicle washing facility, in particular in a gantry car wash, the waste water of the washing facility should be handled such that solid particles that are entrained with the waste water settle in the sedimentation tank. Here, the separation efficiency of the sludge separator should, on one hand, be as high as possible. On the other hand, it should be possible to supply waste water to the sedimentation tank continuously or intermittently during the operation of the washing facility, without the dimensions of the sedimentation tank becoming too large. Fluid should therefore also continuously or intermittently be led back out of the sedimentation tank.

In known sludge separators that have been used in washing facilities, the problem arose that the separation efficiency was too low. There were too many solid particles that had been carried with the waste water into the sedimentation tank still in the discharged fluid. It was further determined that there was a high nitrate content on the outlet side. A high nitrate content in the fluid discharged from the sludge separator should, however, be avoided.

SUMMARY OF THE INVENTION

One aspect of the present invention is therefore to provide a sludge separator which has improved separation efficiency for solid particles, which are supplied to the sedimentation tank via the fluid that is fed in.

Advantageous embodiments and developments are disclosed herein.

According to the invention, the sludge separator described at the start is characterised in that the end section is orientated such that the supplied fluid flows into the sedimentation tank tangentially, and the outlet opening is arranged in a central region of the sedimentation tank in a horizontal plane.

Sludge is understood to be solid particles that are entrained, e.g. suspended, in a stream of fluid. A sludge separator in the sense of the invention is therefore understood to be a device for separating solid particles from a stream of fluid.

The peripheral region of the sedimentation tank is understood in this document to be a radially outer region of the sedimentation tank in a horizontal plane, in which the inlet opening is arranged. Starting from a geometric centre point of the horizontal cross-section of the sedimentation tank, there is the largest horizontal extension of the sedimentation tank in at least one horizontal direction. In the case of a circular disc-shaped cross-section of the sedimentation tank, this largest horizontal extension is the radius of the circular disc. In this instance, the peripheral region reaches from 0% to 30%, in particular from 0% to 10%, of the largest horizontal extension in the direction of the geometric centre point.

The central region of the sedimentation tank is, in this document, understood to be a central region of the sedimentation tank in a horizontal plane, in which the outlet opening is arranged. Starting from the geometric centre point of the horizontal cross-section of the sedimentation tank, the central region reaches from the geometric centre point by up to 40%, in particular 30%, to the edge of the sedimentation tank in the respective horizontal direction.

The end section of the inlet is understood according to the invention to be the section of the inlet that defines the flow direction of the fluid issuing from the inlet opening. Here, the end section is in particular straight. Here, it is orientated substantially tangentially in relation to the sedimentation tank, as well as in particular substantially horizontally. A tangential orientation is here understood to mean that the flow direction in the case of the inlet opening is substantially parallel to a tangent to the edge of the sedimentation tank.

The invention is based on the knowledge that an improved separation efficiency of the sludge separator can be achieved in that the fluid carrying solid particles, which is supplied to the sedimentation tank, has a decreasing flow velocity in the sedimentation tank so that solid particles can settle. Here, vertical flows should be avoided. It has been determined by means of simulations that, depending on the inlet geometry, a fluid whirlpool can form that transports material that has already sedimented back into the upper fluid layers. On the other hand, it was determined that flows can form by means of which the fluid carrying solid particles is supplied directly from the inlet to the outlet. This is disadvantageous, since no solid particles can be separated.

It was determined that the tangential supply of the fluid carrying solid particles leads to the formation of a circumferential flow at the edge with decreasing flow velocity, which favours separating solid particles.

A substantially tangential and/or substantially horizontal orientation of the end section is therefore understood to mean that the end section is orientated such that it forms a circumferential flow at the edge.

It was further determined that the fluid flowing in tangentially in the upper peripheral region of the sedimentation tank, in connection with an upper outlet opening, which is located in the horizontal central region of the sedimentation tank, forms a circumferential flow at the edge in the upper fluid exchange region and a substantially flow-free zone is formed in the horizontal central region. By means of the geometry and arrangement of the inlet and of the outlet according to the invention, it is therefore advantageously achieved that the retention time of the newly supplied fluid in the sedimentation tank is long enough that solid particles can be separated. A flow which leads directly from the inlet opening to the outlet opening is in particular prevented. Vertical flows which are disadvantageous for the separation efficiency of the sludge separator are simultaneously prevented. In this manner, the sludge separator according to the invention can provide improved separation efficiency.

The interior wall of the side wall of the sedimentation tank is in particular cylindrical casing-shaped. The interior wall therefore forms a circle in a horizontal cross-section. In this context, a slow, horizontal flow forms in the upper fluid exchange region by means of the tangential flowing-in of the fluid at the outer edge of the sedimentation tank, which horizontal flow causes a very small flow in the vertical direction, so that no particles that have already sedimented are transported upwards. Simultaneously, volumes of liquid spend a long time in the sedimentation tank, so that solid particles can be especially well separated.

According to other embodiments, the interior wall of the sedimentation tank can, however, also have different geometry. It can, for example, be semi-circular or rectangular.

According to an embodiment of the sludge separator according to the invention, several fins are arranged in the end section of the inlet, which fins are in particular orientated parallel to each other.

It was determined that an autorotation of the supplied fluid is disadvantageous for the separation efficiency of the sludge separator. Such an autorotation leads to flow components of the flow in the sedimentation tank which are orientated downwards. A flow that is orientated downwards in the sedimentation tank also leads, however, to a counter-flow orientated upwards, by means of which solid particles that have already sedimented are transported back upwards. By means of the fins in the end section of the inlet, that are orientated parallel to each other, provided in this embodiment of the sludge separator according to the invention, such an autorotation of the supplied fluid is advantageously prevented. The fins that are orientated parallel to each other therefore prevent a flow in the vertical direction in the sedimentation tank. It was also determined that such vertical flows in the sedimentation tank can be responsible for a high nitrate content on the outlet side of a conventional sludge separator, since biological decomposition products that have formed in the sediment are transported upwards by means of the vertical flow, where they are discharged from the outlet.

The fluid introduced via the inlet has substantially no autorotation due to the fins in the end section of the inlet. The flow surrounds the sedimentation tank substantially in the horizontal plane of the inlet opening and is slowed down here. As soon as the flow reaches the inlet again, the liquid that is further supplied pushes the flow downwards. The component of the flow directed downwards is, however, very small in the whole sedimentation tank. Simulations have shown that the component of the flow directed downwards is smaller by roughly one order of magnitude than the flow velocity along the main component, i.e. in particular in the tangential direction.

It was further determined that the flow, formed by the fins in the end section of the inlet, in connection with an outlet opening which is located in the central region of the sedimentation tank, is advantageous. In the central region, a substantially flow-free zone also forms specifically due to the autorotation of the supplied fluid that is prevented by the fins. By means of the geometry according to the invention of the inlet and of the outlet, it is therefore achieved that the retention time of the fluid in the sedimentation tank is long enough that solid particles can be separated. In this manner, the sludge separator according to the invention can provide an improved separation efficiency.

The fins are in particular each arranged in the end section parallel to each other and in the flow direction of the supplied fluid. The fins in particular extend in the axial direction of the end section of the inlet.

According to an embodiment of the sludge separator according to the invention, the fins have even flow guiding surfaces, the normals of which are each orientated orthogonally to the axial direction of the end section. By means of the flow guiding surfaces, the fins can create an autorotation-free flow in the direction of the inlet opening, whereby the fluid is then led into the sedimentation tank.

The fins can in particular divide the end section into several separate flow channels in a cross-section. Here, the fins can form flow channels that are next to each other in the cross-section. However, it is also possible that the fins form a grid in the cross-section so that the flow channels are then next to each other in two dimensions. An autorotation-free inflow of the fluid into the sedimentation tank can also thereby be ensured.

Preferably, the fins are vertically orientated. It has been shown that, in this case, an especially even horizontal flow can be formed in the upper fluid exchange region of the sedimentation tank, which prevents already-sedimented particles being conveyed upwards by means of vertical flows. The normals of the flow guiding surfaces of the fins are, in this case, therefore in particular orientated horizontally.

The extension of the fins in the axial direction of the end section is in particular larger than the extension in a cross-sectional direction of the end section. The fins are therefore elongated in the axial direction of the end section. An autorotation of the supplied fluid can thereby be prevented especially effectively.

If in the sludge separator according to the invention one or more further inlet openings are provided in addition to the mentioned inlet opening, the end section of this further inlet opening or the end sections of these further inlet openings are orientated like the end section of the one mentioned inlet opening, i.e. the supplied fluid also flows in tangentially to the side wall of the sedimentation tank via the further inlet opening(s).

However, the sludge separator according to the invention in particular only has the mentioned inlet opening. There is therefore in particular no further inlet opening provided.

By means of simulation calculations, it was found that, for example, tangential inlet openings that create horizontally-running counterflows are disadvantageous, since a fluid whirlpool can form that transports volumes of fluid downwards in the vertical direction and this transports sediment of the sedimentation tank back upwards. Such vertical flows can be prevented by having only one inlet opening.

According to a development of the sludge separator according to the invention, the ratio of the smallest cross-sectional area of the inlet to the smallest cross-sectional area of the outlet is in a range of 2 to 10, in particular in a range of 4 to 8, and preferably in a range of 5 to 7. The outlet geometry therefore has a smaller cross-section than the inlet geometry. This causes the fluid flow to accumulate in the tank. This is then in particular advantageous if fluid is supplied intermittently, like, for example, in a gantry car wash. The pulsed inflow of fluid is then actually extended to a longer time interval for the outlet on the outlet side. The average retention time of the fluid in the sedimentation tank is thereby increased, whereby in turn the separation efficiency of the sludge separator is improved.

The outlet opening of the sludge separator according to the invention can in particular be orientated downwards or upwards. An orientation of the outlet opening upwards is advantageous here, since the portion of solid particles that still flows slightly upwards reaches the outlet opening less often in this case. An outlet opening that is orientated downwards can, however, be advantageous, if the outlet is meant to be integrated more simply into an existing sedimentation tank in this manner.

According to a development of the sludge separator according to the invention, the outlet has an overflow opening which is arranged above the outlet opening. It is in particular important when there is an intermittent inflow of the waste water that an overflow opening is provided in order to be able to discharge an excessive amount of fluid that has been introduced into the sedimentation tank. Further, the overflow opening is then in particular important if the outlet cross-section of the outlet is smaller than the inlet cross-section of the inlet.

According to an embodiment of the sludge separator according to the invention, the outlet has a vertically orientated first outlet pipe piece which has the outlet opening formed on one side and which merges on the other side into a horizontally orientated second outlet pipe piece, which in turn opens into a third outlet pipe piece which has a larger cross-section. Here, the third outlet pipe piece can have a dam having an overflow edge and the overflow opening above the opening of the second outlet pipe piece. Advantageously, the overflow opening can thereby be compactly integrated into the pipe pieces of the outlet. On the outlet side, behind the overflow edge, overflowing fluid can be merged with the fluid that is discharged via the outlet opening.

According to a development of the sludge separator according to the invention, the upper fluid exchange region occupies at most the upper 0% to 30%, in particular the upper 0% to 10%, of the height of the sedimentation tank in the vertical direction. Vertically orientated flows which can lead to particles of the sediment being transported upwards to the outlet opening are hereby prevented in the sedimentation tank. In this manner, the separation efficiency of the sludge separator can be improved.

The sedimentation region occupies, for example, at most the lower 0% to 50% in the vertical direction, in particular the lower 0% to 30%, of the height of the sedimentation tank.

According to an embodiment of the sludge separator according to the invention, the inlet opening is arranged above the outlet opening. By means of the vertical distance of the inlet opening from the outlet opening, the sludge separator can be adjusted for an intermittent inflow of fluid. If the inlet opening is, however, arranged above the overflow edge, the level of fluid can only reach up to the overflow edge. Then, the fluid is discharged via the overflow opening. Furthermore, since both the inlet opening and also the outlet opening are arranged in the upper region of the sedimentation tank, horizontal flows are favoured. In particular, vertical vortices are prevented from forming.

According to a development of the sludge separator according to the invention, the inlet opening is arranged at approximately the same height as the outlet opening. The height of the inlet opening in particular differs by less than 15%, in particular less than 10%, of the total height of the sedimentation tank from the height of the outlet opening. The inlet opening is, in this case, arranged in the region of the level of fluid of the sedimentation tank in the vertical direction, which level can, however, fluctuate due to different inlet and discharge rates. Depending on the filling of the sedimentation tank, the inlet opening can also be arranged at least partially above the level of fluid at times.

According to a development of the sludge separator according to the invention, the outlet comprises a suction hose, which is connected with the outlet opening in a gas-tight manner. Here, the suction hose opens into a discharge opening on the outlet side, which is arranged underneath the outlet opening. By means of the suction hose and the height of the outlet opening, the level of fluid can be defined in the sedimentation tank if no fluid is supplied via the inlet. Here, the syphon effect is exploited in order to drain the sludge separator to a defined volume, so that this can subsequently receive a predetermined amount of fluid again. The embodiment of the sludge separator with the suction hose is, then, in particular advantageous if an existing installation of an outlet in a sludge separator is replaced by the geometry according to the invention of the outlet. In this case, it might not be possible to move the height of the outlet downwards in order to provide the corresponding volumes for supplied dirty water. With the suction hose, it is sufficient to move the height of the outlet opening downwards in order to ensure that fluid is discharged up to the height of the outlet opening. This assumes that the level of fluid in a possibly provided collecting tank outside the sedimentation tank, into which the discharge opening of the suction hose opens, is lower than the height of the outlet opening.

By means of the suction hose, a blockage in the inlet can also be prevented if not enough fluid can be supplied via the outlet, since at least one defined volume of fluid can be supplied, without this having to be discharged. On the other hand, such a blockage can be prevented by means of the overflow opening if this is arranged at roughly the height of the inlet opening.

In the sludge separator according to the invention, the following effects, which are achieved by the geometry of the inlet and of the outlet, are combined with each other: The route that the flow from the inlet opening to the outlet opening takes is extended.

An extended retention time of the fluid in the sedimentation tank is thereby achieved. Furthermore, the flow is prevented from hitting the interior walls of the sedimentation tank. The interior walls of the sedimentation tank are, at best, flowed over at a very sharp angle. Further, a flow in the opposite direction is minimised. It is thereby achieved that no fast flows form in the vertical direction, whereby it is in turn prevented that sedimented particles are conveyed upwards. By reducing the outlet geometry, an accumulation of the fluid in the sedimentation tank is achieved. This extends the retention time of the fluid in the sedimentation tank, whereby the separation efficiency of the sludge separator is improved.

The invention further relates to a vehicle washing system having a sludge separator as described above. The vehicle washing system is in particular a gantry car wash, wherein dirty water is intermittently supplied to the sludge separator.

BRIEF DESCRIPTION OF THE DRAWINGS

In the following, an exemplary embodiment of the sludge separator according to the invention is described with reference to the drawings.

The invention is now described using exemplary embodiments with reference to the drawings.

DETAILED DESCRIPTION

Figure 1:
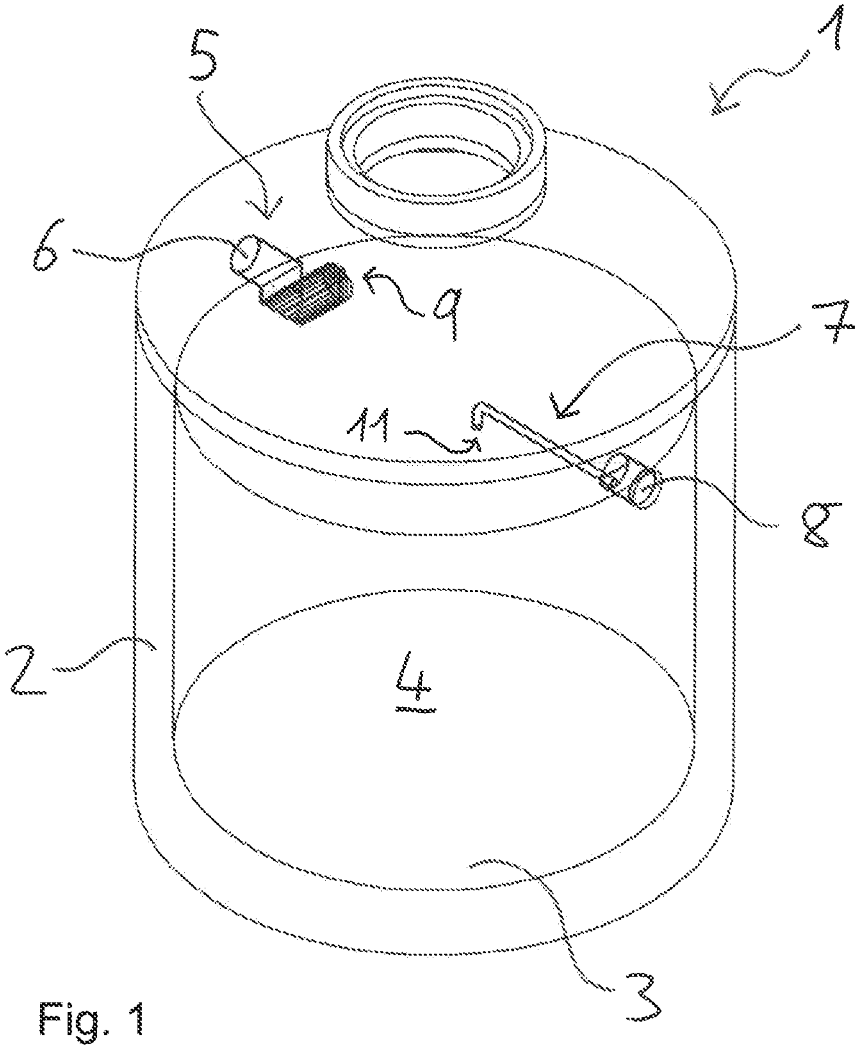
FIG. 1 shows an exemplary embodiment of the sludge separator according to the invention in a perspective view.

The basic structure of the sludge separator 1 according to the invention is described in the following in relation to the FIGS. 1 to 3. The sludge separator 1 is part of a water circulation system of a gantry car wash. The fluid carrying solid particles supplied to the sludge separator 1 is therefore also referred to as dirty water in the following.

The sludge separator 1 comprises a cylindrical side wall 2, which is closed at the bottom by a circular disc-shaped base 3, so that a sedimentation tank 4 is formed in the interior of the sludge separator 1. At the top of the cylindrical side wall 4, the sludge separator 1 is closed by a cone lid 18.

In the vertical direction, the sedimentation tank 4 is separated into a lower sedimentation region A, an intermediate region B and an upper fluid exchange region C. The upper fluid exchange region C occupies, for example, the upper 0% to 30%, in particular the upper 0% to 10%, of the height of the sedimentation tank 4 in the vertical direction. The sedimentation region A occupies, for example, the lower 0% to 50%, in particular the lower 0% to 30%, of the height of the sedimentation tank 4 in the vertical direction.

In the upper fluid exchange region C, an inlet 5 and an outlet 7 are provided. To this end, a first opening 6 for the inlet 5 and a second opening 8 for the outlet 7 is arranged in the side wall 2. The inlet 5 has an inlet opening 9 via which dirty water containing solid particles can be supplied to the sedimentation tank 4. The outlet 7 has an outlet opening 11 via which fluid can be discharged from the sedimentation tank 4. Further details of the inlet 5 and of the outlet 7 are explained later.

Figure 2:
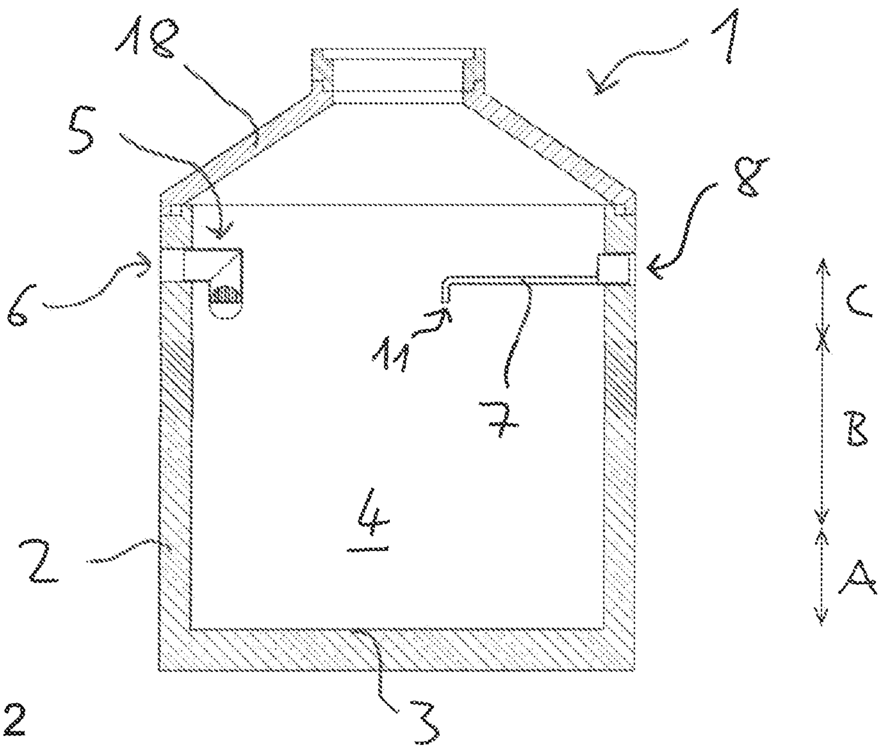
FIG. 2 shows a vertical cross-section of the exemplary embodiment of the sludge separator according to the invention.

As shown in FIG. 2, the inlet opening 9 is located at approximately the height of the outlet opening 11. In a state of equilibrium for supplied dirty water and discharged fluid, the inlet opening 9 is therefore arranged at the height of the level of fluid in the sedimentation tank 4. Both the inlet opening 9 and also the outlet opening 11 are, however, arranged in the upper part of the sludge separator 1, i.e. in the upper fluid exchange region C.

Figure 3:
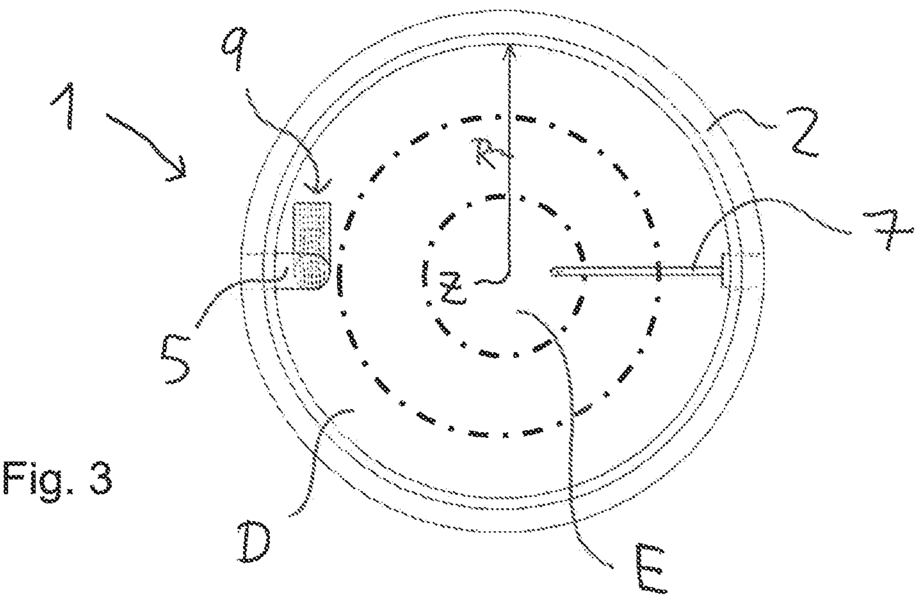
FIG. 3 shows the exemplary embodiment of the sludge separator according to the invention in a view from above.

As shown in FIG. 3, a peripheral region D and a central region E are formed in a horizontal plane in which the inlet 9 and the outlet opening 11 are arranged. Starting from the central point Z of the horizontal cross-section of the sedimentation tank 4, the peripheral region D reaches from outside 0% to 30%, in particular from 0% to 10%, of the radius R in the direction of the central point Z and the central region E reaches from the central point Z to 40%, in particular 30%, of the radius R in the direction of the edge of the side wall 2 of the sedimentation tank 4. The radius R of the sedimentation tank 4 is 1 m in this case.

Figure 4:
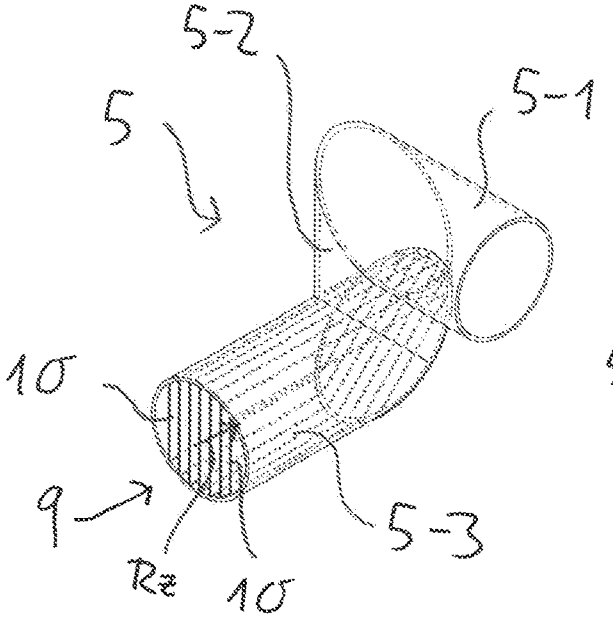
FIG. 4 shows the inlet of the exemplary embodiment of the sludge separator according to the invention in a first perspective view.
Figure 5:
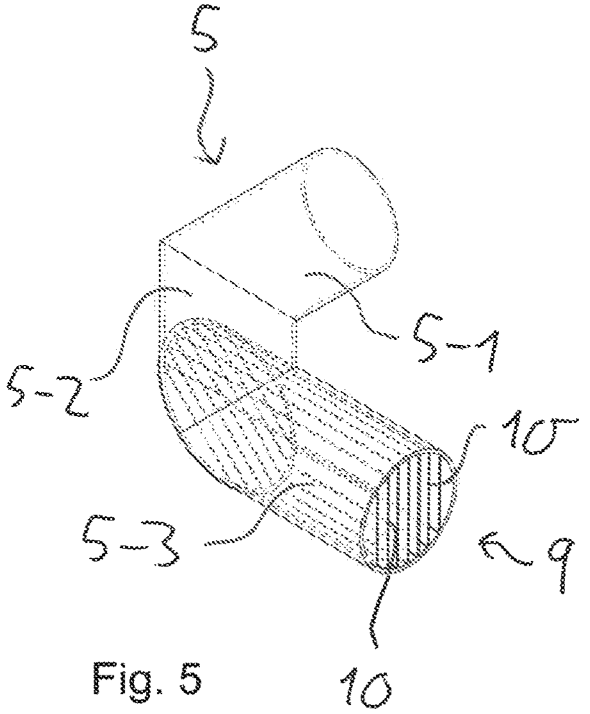
FIG. 5 shows the inlet of the exemplary embodiment of the sludge separator according to the invention in a second perspective view.

In the following, details of the inlet 5 are explained with reference to FIGS. 4 and 5.

The inlet 5 has a first inlet pipe piece 5-1. This first inlet pipe piece 5-1 is inserted with an opening into the first opening 6 of the side wall 2. It is orientated horizontally. On the other end of the first inlet pipe piece 5-1, a second inlet pipe piece 5-2 is connected, which is orientated vertically. A third inlet pipe piece 5-3 is connected to this second inlet pipe piece, which is also referred to as the end section 5-3 of the inlet 5. This end section 5-3 is orientated such that the dirty water supplied via the inlet 5 flows into the sedimentation tank 4 tangentially. It is furthermore orientated horizontally. The inlet pipe pieces 5-1 to 5-3 have a diameter of 150 mm. The inlet opening 9 is located in the outer peripheral region D of the sedimentation tank 4. Here, the normal of the surface formed by the inlet opening 9 is orientated tangentially to the side wall 2 of the sedimentation tank 4 and horizontally.

The sludge separator 1 only has one inlet opening 9 for supplying dirty water into the sludge separator 4.

Several fins 10 which are orientated parallel to each other are arranged in the end section 5-3. The end section 5-3 is cylinder-shaped, so that an axial direction of the end section 5-3 is defined. This axial direction is orientated horizontally and tangentially to the cylindrical side wall 2. The fins 10 are orientated vertically. They divide the end section 5-3 into several separate flow channels in a cross-section perpendicular to the axial direction of the end section 5-3. The fins 10 have even flow guiding surfaces, the normals of which are each orientated orthogonally to the axial direction of the end section 5-3. The normals of the flow guiding surfaces of the fins 10 are therefore orientated horizontally. The end section 5-3 opens into the inlet opening 9. Here, the inlet opening 9 is separated into the openings that are formed by the flow channels, which are formed by the fins 10. The total area of the inlet opening 9 has the radius Rz. The normal of the surface of the inlet opening 9 is orientated horizontally and tangentially in relation to the cylindrical side wall 2.

The fins 10 are configured as thin, even plates, which are inserted vertically into the third inlet pipe piece 5-3, wherein their extension in the axial direction of the third inlet pipe piece 5-3 is larger than in the cross-sectional direction of the inlet pipe piece 5-3. The fins 10 ensure that the supplied dirty water, which tends to cause an autorotation by means of the angled arrangement of the three inlet pipe pieces 5-1 to 5-3, is guided in the end section 5-3 such that this autorotation is lost and the dirty water enters the sedimentation tank 4 at the inlet opening 9 in a tangential and horizontal manner, whereby a somewhat vertical speed component of the incoming dirty water is minimised.

Figure 6:
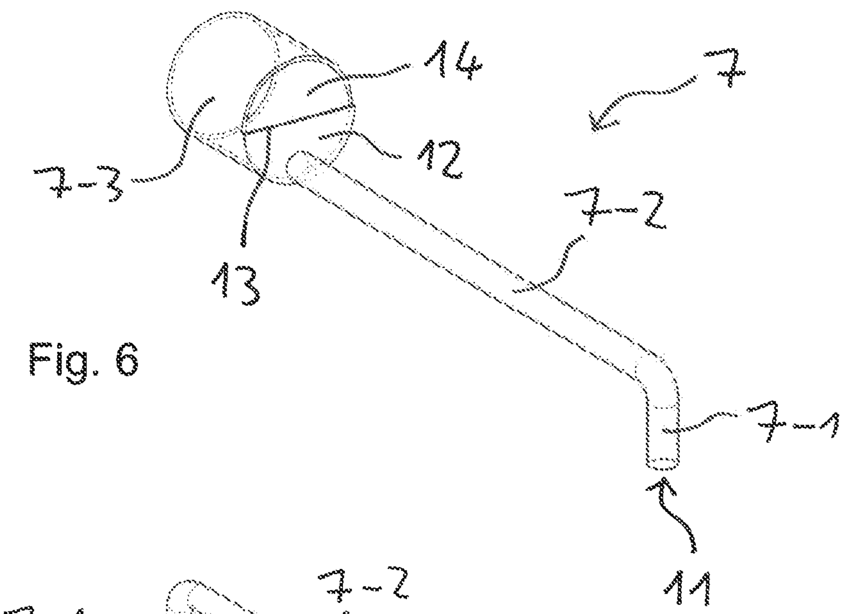
FIG. 6 shows the outlet of the exemplary embodiment of the sludge separator according to the invention of a first perspective view.
Figure 7:
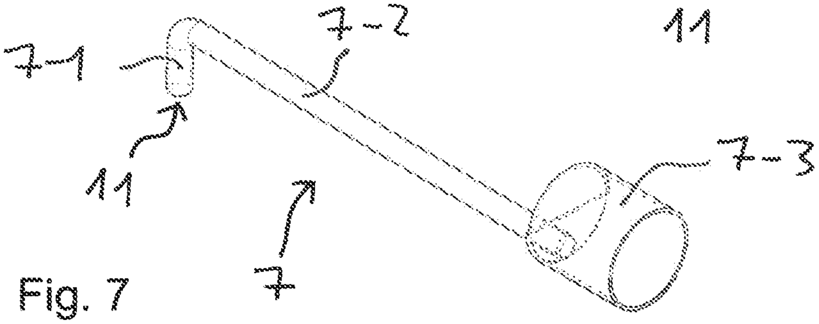
FIG. 7 shows the outlet of the exemplary embodiment of the sludge separator according to the invention of a second perspective view.

With reference to FIGS. 6 and 7, details of the outlet 7 are described in the following:

The outlet 7 has a first outlet pipe piece 7-1 on one end of which the outlet opening 11 if formed. The first outlet pipe piece 7-1 is orientated vertically. The normal of the surface formed by the outlet opening 11 is orientated vertically. In the exemplary embodiment described here, the normal of the surface of the outlet opening 11 points downwards. Alternatively, the normal of the surface of the outlet opening 11 can, however, also point upwards. On the other end, the first outlet pipe piece 7-1 merges into a longer, second outlet pipe piece which is orientated horizontally. The second outlet pipe piece 7-2 merges, in turn, into a third outlet pipe piece 7-3 which has a larger cross-section. The end of the third outlet pipe piece 7-3 that is downstream is inserted into the second opening 8 of the side wall 2.

The interior diameter of the third outlet pipe piece 7-3 is 140 mm, the interior diameter of the outlet opening 11, of the first outlet pipe piece 7-1 and of the second outlet pipe piece 7-2 is respectively 25 mm, and the overflow edge 13 is 72 mm above the lower opening of the second outlet pipe piece 7-2 into the third outlet pipe piece 7-3.

The outlet 7 is inserted into the sludge separator 1 such that the outlet opening 11 is located in the central region E of the sedimentation tank 4. Fluid is therefore discharged from the sedimentation tank 4 from the centre via the outlet 7.

The outlet 7 has a smaller cross-section than the inlet 5, so that the dirty water 5 can be supplied at a higher volume rate via the inlet 5 than fluid is discharged from the sedimentation tank 4 via the outlet 7. In the exemplary embodiment of the sludge separator 1 described, the ratio of the smallest cross-section of the inlet 5 to the smallest cross-section of the outlet 7 is six.

During the operation of the sludge separator 1, dirty water is in particular intermittently supplied to the sedimentation tank 4, so that the level of fluid in the sedimentation tank 4 increases from a minimum height to a maximum height. As soon as the level of fluid exceeds the highest point of the outlet 7, fluid is simultaneously discharged out of the sedimentation tank 4 via the outlet 7. So that the level of fluid in the sedimentation tank 4 does not rise above a threshold height, an overflow opening 14 which is arranged above the outlet opening 11 is provided for the outlet 7. The overflow opening 14 is delimited by a dam 12 at the bottom, which forms an overflow edge 13. The dam 12 is located at the opening of the second outlet pipe piece 7-2 into the third outlet pipe piece 7-3, as is shown in FIGS. 6 and 7.

The upper fluid exchange region C (see FIG. 2) can be defined such that it reaches upwards to the overflow edge 13.

Figure 8:
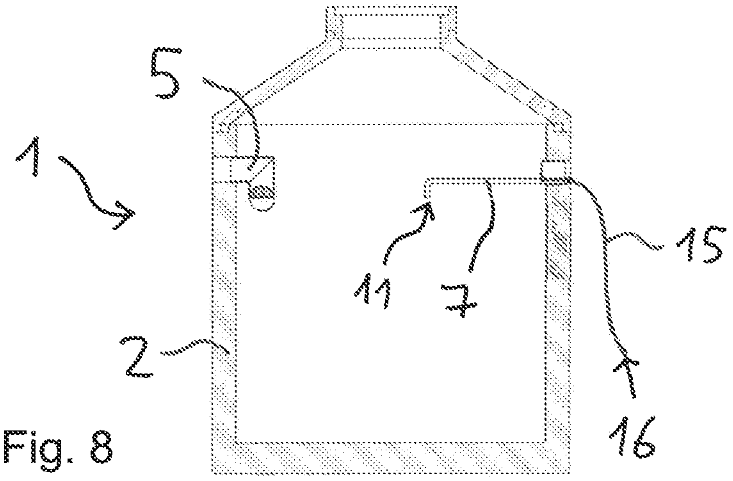
FIG. 8 shows a vertical cross-section of a further exemplary embodiment of the sludge separator according to the invention.

In order to adjust a minimum level of fluid, if no dirty water is supplied via the inlet 5, a suction hose 15 can be provided in a further exemplary embodiment that is shown in FIG. 8. This suction hose 15 is connected in a gas-tight manner with the outlet opening 11. The suction hose 15 can, for example, be closed at the opening of the second outlet pipe piece 7-2 into the third outlet pipe piece 7-3 at the opening of the second outlet pipe piece 7-2 (see FIG. 7).

On the outlet side, the suction hose 15 is then guided downwards outside the side wall 2, for example into a collecting tank. The suction hose 15 has an outlet opening 16 outside the side wall 2, which is arranged under the outlet opening 11. By means of the suction hose 15, the level of fluid in the sedimentation tank 4 can be determined by the syphon effect, via the height of the outlet opening 11, independently of the highest point of the outlet 7, if no more dirty water is supplied via the inlet 5. This level of fluid is then located at the height of the outlet opening 11, provided that the level of fluid in a collecting tank into which the outlet opening 16 opens, lies below the height of the outlet opening 11. If dirty water, for example from a gantry car wash, is then supplied to the sedimentation tank 4 again via the inlet 5, the level of fluid rises. This rising slows down if the level of fluid has exceeded the highest point of the outlet 7, since fluid is then discharged out of the sedimentation tank 4 via the outlet 7. The volume flow of the outlet 7 is, however, smaller than the volume flow of the dirty water supplied via the inlet 5, due to the smaller cross-sections. The rising of the level of fluid is therefore slowed down. Should the level of fluid exceed the height of the overflow edge 13, fluid drains off via the overflow opening 14. If the inflow of the dirty water via the inlet 5 ends, then the level of fluid sinks to the highest point of the outlet 7 or, if the suction hose 15 is used, to the outlet opening 11.

Flow simulations have been carried out for sludge separator 1, in order to identify which flows occur in the sedimentation tank 4. In the simulation it was assumed that fluid, more precisely a non-compressible two-phase fluid formed of air and water, is supplied via the inlet 5 at an ambient pressure of 1.013 bar and is discharged via the outlet 7. An adjustable mesh on the free water surface served as a basis for the simulation. The non-stationary simulation was carried out with time increments of 0.025 s over a simulation time of 180 s. Here, water flowed in at a rate of 200 l/min. A volume flow of up to 12.8l/min was set via the outlet 7, which is discharged from the sedimentation tank 4. The inlet opening was located at a height of 1.67 m. There were sedimented particles up to a height of 0.835 m above the base of the sedimentation tank 4.

The flow behaviour in the sedimentation tank 4, which was observed in the simulation, can be summarised as follows:

By means of the inflow of the fluid, the level of fluid increases. A rotational flow occurs during in-flow. A negative pressure area in the centre of the sedimentation tank 4 is thereby created, from which the fluid flowing out is discharged from the sedimentation tank 4 via the outlet opening 11. At the beginning of the inflow process, there is a minor vertical flow direction downwards next to the tangential flow direction in the sedimentation tank 4, which, however, reduces again as soon as the rotational flow has stabilised. If a volume of fluid has circled the sedimentation tank 4 peripherally, then there is a slight flow downwards when this volume of fluid meets with supplied fluid again.

If horizontal cross-sections of the sedimentation tank 4 are observed, there is substantially no vertical flow downwards or upwards from the central height of the sedimentation tank 4. Therefore, no sediment is transported upwards. Only 125 mm below the inlet opening 9, there is a vertical flow component when the fluid flows in, which decreases with increasing inflow duration. If a cross-section at the height of the inlet opening 9 is observed, it can be seen that a vertical flow component initially forms around the outer peripheral region, which, however, becomes lower as soon as a horizontally circulating inflow vortex has formed. In the centre at the outlet opening 11, a low-flow region forms that has substantially no vertical flow. A vertical flow occurs only by means of the fluid that enters the first outlet pipe piece 7-1 in the outlet 7 via the outlet opening 11.

LIST OF REFERENCE NUMERALS

1 Sludge separator
2 Cylindrical side wall
3 Base
4 Sedimentation tank
5 Inlet
5-1 First inlet pipe piece
5-2 Second inlet pipe piece
5-3 Third inlet pipe piece; end section
6 First opening of the side wall
7 Outlet
7-1 First outlet pipe piece
7-2 Second outlet pipe piece
7-3 Third outlet pipe piece
8 Second opening of the side wall
9 Inlet opening
10 Fins
11 Outlet opening
12 Dam
13 Overflow edge
14 Overflow opening
15 Suction hose
16 Discharge opening
17 Sediment
18 Cone lid
A Lower sediment region
B Intermediate region
C Upper fluid exchange region
R Radius of the sedimentation tank
Z Centre
Rz Radius of the inlet opening

The invention claimed is:

1. A sludge separator having:

a sedimentation tank that has a side wall and a base, wherein the sedimentation tank is divided in a vertical direction into a lower sedimentation region, an intermediate region and an upper fluid exchange region, an inlet for supplying a fluid carrying solid particles into the sedimentation tank, the inlet having an end section having an inlet opening, wherein the inlet opening is arranged in the upper fluid exchange region in the vertical direction and opens into the sedimentation tank in a horizontal plane in a peripheral region of the sedimentation tank, and an outlet for discharging the fluid out of the sedimentation tank, the outlet having an outlet opening which is arranged in the upper fluid exchange region in the vertical direction, wherein the end section is orientated such that the supplied fluid flows into the sedimentation tank tangentially, wherein the outlet opening is arranged in a central region of the sedimentation tank in the horizontal plane, and wherein several fins are arranged in the end section of the inlet, the several fins being configured to prevent autorotation of the supplied fluid.

2. The sludge separator according to claim 1, wherein the end section of the inlet is straight.

3. The sludge separator according to claim 1, wherein the end section of the inlet is orientated substantially tangentially in relation to the sedimentation tank.

4. The sludge separator according to claim 1, wherein the end section of the inlet is orientated substantially horizontally.

5. The sludge separator according to claim 1, wherein the several fins are orientated parallel to each other.

6. The sludge separator according to claim 1, wherein the several fins are each arranged in the end section in a flow direction of the fluid to be supplied.

7. The sludge separator according to claim 1, wherein the several fins have planar flow guiding surfaces, normals of the planar flow guiding surfaces being each orientated orthogonally to an axial direction of the end section.

8. The sludge separator according to claim 1, wherein the several fins divide the end section into several separate flow channels in a cross-section.

9. The sludge separator according to claim 1, wherein the several fins are vertically orientated.

10. The sludge separator according to claim 1, wherein an extension of the several fins in an axial direction of the end section is larger than in a cross-sectional direction of the end section.

11. The sludge separator according to claim 1, wherein the sludge separator only has the inlet opening.

12. The sludge separator according to claim 1, wherein a ratio of a smallest cross-sectional area of the inlet to a smallest cross-sectional area of the outlet is in a range of 2 to 10, in particular in a range of 4 to 8.

13. The sludge separator according to claim 1, wherein the outlet opening is orientated upwards.

14. The sludge separator according to claim 1, wherein the outlet opening is orientated downwards.

15. The sludge separator according to claim 1, wherein the outlet has an overflow opening which is arranged above the outlet opening.

16. The sludge separator according to claim 15, wherein the outlet has a vertically orientated first outlet pipe piece which has the outlet opening formed on one side and which merges on another side into a horizontally orientated second outlet pipe piece, which in turn opens into a third outlet pipe piece which has a larger cross-section, and wherein the third outlet pipe piece has a dam having an overflow edge and the overflow opening above an opening of the second outlet pipe piece.

17. The sludge separator according to claim 1, wherein an upper fluid exchange region occupies at most an upper 0% to 30%, in particular the upper 0% to 10%, of a height of the sedimentation tank in the vertical direction.

18. The sludge separator according to claim 1, wherein the inlet opening is arranged at approximately a same height as the outlet opening.

19. The sludge separator according to claim 1, wherein the outlet comprises a suction hose which is connected with the outlet opening in a gas-tight manner and, wherein the suction hose opens on an outflow side into a discharge opening which is arranged underneath the outlet opening and above the base of the sedimentation tank.

20. A vehicle washing system having a sludge separator according to claim 1.

* * * * *